Figure 1:
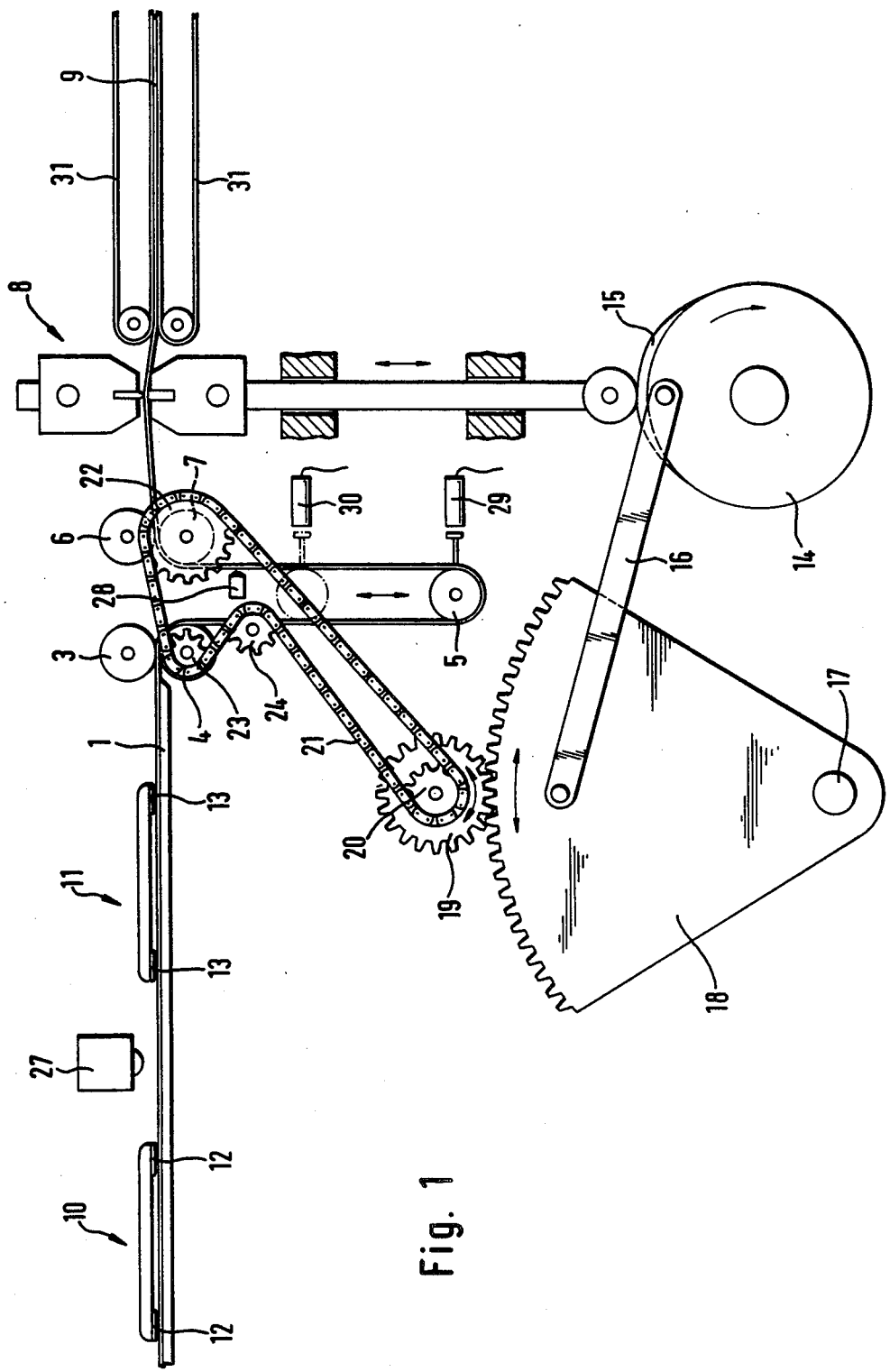

United States Patent [19]

Mundus et al.

[11] Patent Number: 4,462,857
[45] Date of Patent: Jul. 31, 1984

[54] APPARATUS FOR TREATING AND SEVERING SECTIONS FROM INTERMITTENTLY FED WEBS

[75] Inventors: Friedhelm Mundus, Lengerich; Heinrich Lippmann, Recke, both of Fed. Rep. of Germany

[73] Assignee: Windmoller & Holscher, Lengerich, Fed. Rep. of Germany

[21] Appl. No.: 460,787

[22] Filed: Jan. 25, 1983

[30] Foreign Application Priority Data

Jan. 26, 1982 [DE] Fed. Rep. of Germany ....... 3202337

[51] Int. Cl.³ .............................................. B32B 31/20
[52] U.S. Cl. .................................. 156/361; 156/515; 156/538; 493/205; 493/226
[58] Field of Search .................. 226/32, 44, 115, 118; 83/209–211, 250, 234, 255; 156/515, 361; 493/203, 205, 207, 209, 226

[56] References Cited

U.S. PATENT DOCUMENTS

| | | | |
|---|---|---|---|
| 3,676,270 | 7/1972 | Lehmacher | 156/515 X |
| 3,698,289 | 10/1972 | Kamins et al. | 493/203 X |
| 4,371,413 | 2/1983 | Mundus | 156/515 X |

Primary Examiner—David A. Simmons
Attorney, Agent, or Firm—Fleit, Jacobson, Cohn & Price

[57] ABSTRACT

In an apparatus for applying handles to an intermittently fed web of plastics sheet material and severing bag sections therefrom by transverse weld seams, treating means for the web disposed upstream of two successive pairs of feed rollers and operative when the web is stationary simultaneously carry out like processes on a plurality of web sections which will later be severed into a corresponding number of bags. The feed roller pair nearest to the treating means is effective to feed the web in steps equal to the sum of the lengths of simultaneously treated web sections whereas the other pair feeds the web in steps equal to only one web section length but is operative as many times more frequently as there are simultaneously treated web sections.

6 Claims, 2 Drawing Figures

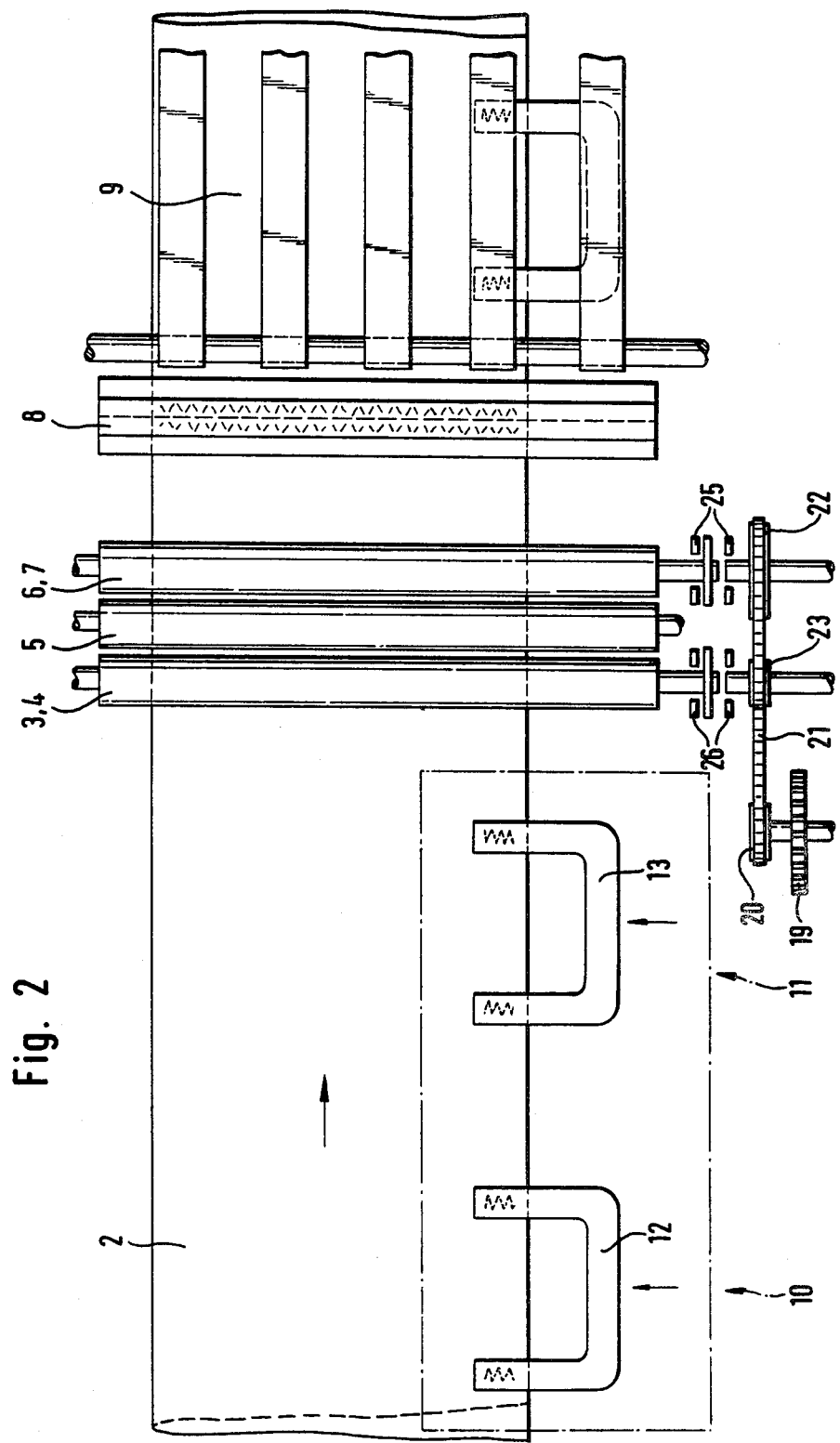

APPARATUS FOR TREATING AND SEVERING SECTIONS FROM INTERMITTENTLY FED WEBS

The invention relates to an apparatus according to the classifying portion of claim 1.

In apparatuses of this kind, treatment of the web portions corresponding to the subsequent web sections often takes up more time than is necessary for severing these sections from the web, so that the cycle determining the output of the machine is governed by the length of the treating periods even though the severing means could operate at a higher rate. For example, in the production of carrier bags, more time is required to weld the pairs of handles onto the edges of semi-tubular webs in the vicinity of web sections corresponding to the eventual bag widths than is necessary for severing the bags from the web by means of transverse weld seams.

It is therefore the problem of the invention to increase the output of an apparatus of the aforementioned kind by so adapting the treatments to be carried out on the web to the transverse severing means that the maximum number of cycles of the latter can be fully utilised.

According to the invention, this problem is solved by the features recited in the characterising portion of claim 1. In the apparatus of the invention, treatments are performed simultaneously on such a large number of eventual web sections as correspond to the sum of the cycle periods required to be performed by the transverse severing means during the treating period. The web is intermittently fed through a length corresponding to the treated sections corresponding to a cycle which is reduced in relation to that of the transverse severing means by the number of simultaneously treated eventual web sections and this web length is accumulated in a store from which it is intermittently withdrawn corresponding to the maximum treating speed of the transverse severing means. The output of the machine can therefore be markedly increased by an apparatus according to the invention.

A particularly advantageous embodiment of the invention is the subject of claim 3. If the chain is intermittently driven only through a length corresponding to the length of the web section to be severed, a clutch-brake combination could be dispensed with for the downstream pair of feed rollers which intermittently feeds the web to the transverse severing means by only one section length at a time, because the upstream pair of feed rollers would have to be coupled to its associated sprocket only at a cycle reduced by the number of simultaneously treated web sections.

However, a simpler change to different sizes will be achieved if clutch-brake combinations are provided for both pairs of feed rollers, the web being provided with registration marks scanned by photo-sensors for controlling the clutch-brake combinations. It is also possible to provide means scanning the position of the dancer roller for the purpose of controlling the clutch-brake combinations.

The apparatus of the invention can be particularly advantageously employed for a machine making carrier bags with loop handles in that the treating means consist of apparatuses for simultaneously supplying and welding on two pairs of handles at a time and a transverse welding-separating apparatus is provided to weld off the bags.

An example of the invention will now be described in more detail with reference to the drawing, wherein:

FIG. 1 is a diagrammatic side elevation of an apparatus for making carrier bags with looped handles, and FIG. 2 is a plan view of the FIG. 1 apparatus.

A supporting table 1 is secured in a frame which has been omitted for clarity. A semi-tubular web 2 of thermoplastic material is fed above the table from a supply reel by a pair of feed rollers 3, 4. Downstream of the feed rollers 3 and 4, there is a dancer roller 5 which forms a loop of variable size in the passing semi-tubular web 2. Following the dancer roller 5, the semi-tubular web passes through two further feed rollers 6 and 7 to be fed to transverse welding means 8.

By means of these transverse welding means 8, individual bags 9 are then severed from the semi-tubular web 2. To permit as high a number of cycles as possible for the transverse welding means 8, two intercoupled welding means 10 and 11 are provided above the supporting table 1. These are operable in unison so that two pairs of looped handles 12 and 13 can be welded on simultaneously. The number of cycles for the transverse welding means can therefore here be twice as large as would be possible if only one of the welding means 10 or 11 were provided.

As is particularly shown in FIG. 1, the transverse welding means are cyclically operated by a disc 14 having a cam 15 thereon. The disc 14 is pivoted to a swing arm 16 which, in turn, cyclically swings a gear segment 18 to and fro through a predetermined angle, the segment being pivoted about a pin 17. The gear segment 18 engages a gear 19 concentrically connected to a sprocket 20. This sprocket 20 is connected to further sprockets 22 and 23 by a chain 21, the sprocket 22 being connected to the feed roller 7 and the sprocket 23 to the feed roller 4, in each case by way of a clutch-brake combination 25 and 26. To ensure that the sprocket 23 is enveloped by a sufficient amount, a pressure roller 24 is provided which assumes the position shown in FIG. 1. Upon commencement of the operating process, therefore, two pairs 12 and 13 of looped handles that were applied to the semi-tubular web 2 by a generally known looped handle unit are securely welded to the semi-tubular web 2 by means of the welding means 10 and 11. The feed rollers 3 and 4 are then switched on and operated until the photocell 27 has, for example, scanned a sufficient number of registration marks and the next two pairs of looped handles can be brought up. During this feeding movement, the feed rollers 6 and 7 are also switched on so that the web supplied by the feed rollers 3 and 4 are pulled downwardly by the dancer roller are withdrawn again by the feed rollers 6 and 7. However, since the circumference of the sprocket 22 is twice that of the sprocket 23, only half the length of web fed by the feed rollers 3 and 4 is taken away by the feed rollers 6 and 7.

The operative period of the feed rollers 6 and 7 is determined by the photocell 28 which likewise scans registration marks. However, this photocell 28 counts only half the registration marks counted by the photocell 27. During the next oscillation of the gear segment 18, the clutch-brake combination 26 of the feed rollers 3 and 4 is operated so that the latter are not operated but only the feed rollers 6 and 7 are operated by way of the clutch-brake combination 25 and of course the transverse welding means 8 are also operated. Consequently the feed rollers 3 and 4 are actuated only during each alternate cycle of the welding means 8 or feed rollers 6 and 7 but they take in twice the length of web withdrawn by the feed rollers 6 and 7. The segment 18 is designed so that changes in size can be carried out within limits, i.e. the spacing of the pairs of looped handles 12 and 13 can be changed by replacing the welding means 10 and 11, respectively. If, now, carrier bags are to be made from an unprinted semi-tubular web, i.e. one which is not provided with registration marks, the switching on period for the feed rollers 3 and 4 is determined by a proximity initiator 29 and the switching on period for the feed rollers 6 and 7 by the proximity initiator 30. The finished carrier bags 9 welded off from the semi-tubular web 2 are then led away by means of a conveyor belt system 31.

We claim:

1. Apparatus for treating and severing sections from intermittently fed webs, preferably for welding pairs of handles onto the edges of semi-tubular webs of thermoplastic material and severing bags therefrom by transverse weld seams, comprising intermittent feeding means for the web, transverse severing means for severing sections from the web during standstill periods thereof, and treating means upstream thereof, characterised in that the upstream treating means (10, 11) extend over a length of web corresponding to several lengths of sections and carry out like processes on the eventual sections during a standstill period of the web, that between the treating means (10, 11) and the transverse severing means (8) there are two spaced intermittently driven pairs of feed rollers (3, 4; 6, 7) of which the upstream pair feeds the web during each feeding interval by a web length corresponding to the number of treated sections and the downstream pair feeds the web by one section length during feeding intervals of which the cycle is higher by the number of sections to be treated, and that between the pairs of feed rollers (3, 4; 6, 7) there are storing means (5) which store the web length fed by the upstream feed roller pair (4, 3) but not yet taken up by the downstream pair (6, 7).

2. Apparatus according to claim 1, characterised in that the storing means consist of a dancer roller (5) which store the web (2) in a loop.

3. Apparatus according to claim 1, characterised in that the feed roller pairs (3, 4; 6, 7) of equal roller diameters are provided with sprockets (22, 23) which are connectible thereto by clutch-brake combinations (25, 26) and of which the sprocket (22) associated with the downstream feed roller pair (6, 7) has a diameter which is larger than the diameter of the sprocket (23) associated with the upstream feed roller pair (3, 4) by a factor corresponding to the number of section lengths treated in the treating means, that the sprockets (22, 23) are enveloped by a common endless chain (21) intermittently driven so that it turns the downstream feed roller pair (6, 7) corresponding to one section length at a time, and that means (27, 28; 29, 30) for controlling the clutch-brake combinations (25, 26) are provided which, after a number of feeding cycles has been imparted to the downstream feed roller pairs (6, 7) corresponding to the number of section lengths treated by the treating means, couple the upstream feed roller pair (3, 4) to the associated sprocket (23).

4. Apparatus according to claim 1, characterised in that for controlling the clutch-brake combinations (25, 26), registration marks applied to the web (2) are scanned by photosensors (27, 28).

5. Apparatus according to claim 1, characterised in that control of the clutch-brake combinations (25, 26) is effected by means (29, 30) sensing the position of the dancer roller (5).

6. Apparatus according to claim 1, characterised in that the treating means consist of apparatuses (10, 11) which supply two pairs of handles (12, 13) at a time and simultaneously weld them on and that a transverse welding-separating apparatus (8) is provided to weld the bags (9) off.

* * * * *